INVENTOR.
John J. Rheinfrank
BY Frank A. Steinlicher
ATTORNEY.

March 8, 1966 J. J. RHEINFRANK 3,239,465
XEROGRAPHIC DEVELOPER
Filed May 12, 1958 5 Sheets-Sheet 3

INVENTOR.
John J. Rheinfrank
BY
Frank A. Steinhilper
ATTORNEY.

March 8, 1966 J. J. RHEINFRANK 3,239,465
XEROGRAPHIC DEVELOPER
Filed May 12, 1958 5 Sheets-Sheet 4

INVENTOR.
John J. Rheinfrank
BY
Frank A. Steinhilper
ATTORNEY.

INVENTOR.
John J. Rheinfrank

ATTORNEY.

United States Patent Office 3,239,465
Patented Mar. 8, 1966

3,239,465
XEROGRAPHIC DEVELOPER
John J. Rheinfrank, Columbus, Ohio, assignor, by mesne assignments, to Xerox Corporation, a corporation of New York
Filed May 12, 1958, Ser. No. 735,093
12 Claims. (Cl. 252—62.1)

This application is a continuation-in-part of my copending application Ser. No. 339,208, filed February 27, 1953, now abandoned.

The present invention relates in general to the art of electrophotography or xerography, which is the art of taking pictures and developing them utilizing electrical forces rather than chemical solutions. In particular, the present invention relates to new and novel compositions, articles, apparatus and methods or processes utilizing the field of electric photography and its related branches.

The method of electrophotography described by Carlson in U.S. Patent No. 2,297,691 and known now as xerography, discloses a way in which an electrostatic charge pattern representing an image to be reproduced may be formed. After forming the image, it is then treated with an electroscopic material to form an image body which can be transferred to a second surface or transfer material, and fixed thereto by the application of heat or by a suitable adhesive or the like which will hold the powder particles thereon. The resulting images are excellent reproductions of the original material. Frequently, however, the prior art methods of transfer, particularly transfer by electrostatic forces, were affected by atmospheric conditions or other external factors, and it is an important object of the present invention to provide a method of effecting transfer of powder images without distortion and fuzziness or other deficiencies by a process unaffected by atmospheric conditions and, optionally, wherein the powder is instantly fixed to the transfer medium.

It is another object of the present invention to provide a new and novel powder composition for use in developing powder images and which can be transferred from an image surface to a transfer medium unaffected by atmospheric conditions to result in perfect reproductions.

It is a further object of this invention to provide a machine or apparatus for effecting transfer of powder images, said apparatus characterized by its freedom from atmospheric effects.

It is a still further object of the present invention to provide a new and novel copy material utilizing the compositions disclosed herein in the manner as set forth.

It is again an object of this invention to provide a method of simultaneously transferring and fixing powder images.

It is yet again an object of this invention to provide toners which are dense and black, unaffected by atmospheric conditions while being transferred, susceptible to electrostatic and electromagnetic forces, and readily fusible and settable.

It is still again an object of the present invention to provide an article having an improved image on its surface.

These, and other objects and advantages of the present invention, will become more apparent from the following detailed description, examples, and drawings, wherein.

It has now been found that magnetic material can readily be combined with an organic electroscopic binder to provide a very efficient xerographic toner and, that a new and novel machine employing electromagnetic means of high and low frequency can be utilized to simultaneously transfer and fuse an image to another medium uninfluenced by humid atmospheric conditions. Such toner powders can be readily developed by known electrostatic methods and then transferred in one operation, without distortion, to another media, which may be either electrically or nonelectrically conducting. Moreover, such an electroscopic-magnetic powder toner provides intense dark or black reproductions of pictures and such developers can be used with carrier compositions to provide sharp and detailed images. In addition, photosensitive members and other devices employing the new and improved composition of the present invention are generally easier to clean than conventional powders.

As the toner particles of the instant invention respond to both electrostatic and magnetic field, they are eminently suitable for use in present day computer and business machines requiring differential image effects. This added flexibility by means od differential transfer of the toner images is a unique and useful property of the toners of the instant invention.

In general, the toner of the present invention comprises an electroscopically or electrostatically chargeable component and a magnetic component. It will be understood that the toners of the present invention are intended to be attracted to, and held by, electrostatically charged areas of the image surface to form a developed image body. As stated hereinbefore, the electrostatic image is readily developed by contacting the charged areas with the electroscopic-magnetic powder toner in any convenient way, for example, by forming a layer of the electroscopic-magnetic powder on a carrier surface by reason of electrostatic attraction between the powder and the carrier surface and then contacting the powder-bearing carrier surface with the charge-bearing surface. (The powder which is to constitute the powder image through adherence to the electrostatic image is called a "toner," while the combination of carrier and toner, i.e., the total combination which contacts the electrostatic image, is a "developer." Where the toner contacts the electrostatic image without the use of a carrier, it may properly be termed a developer.) Various ways of accomplishing this are by coating a sheet as of plastic, plastic coated metal, slightly conductive rubber, etc., with the toner particles, by coating the surface of a granular carrier with the electroscopic-magnetic powder, by coating a cylinder or drum with the toner, by flowing the toner across the charge-bearing surface, or by exposing the charged surface to the toner developer in the form of a dust cloud or by other desired means or methods of bringing the charged particles into the effective field of the electrostatic image.

During, or as a result of this procedure, the toner particles are attracted to, and held by the charge-bearing areas of the surface but are not attracted to and retained by those portions of the surface which are uncharged. In this manner, an image body corresponding to the electrostatic charge pattern is formed on the surface being developed, such image being made up of retained toner particles. It is particularly desirable that the image so formed be sharp and clear, and that the image areas be dense and black, compared wtih the adjacent non-image areas. The electroscopic-magnetic developing toners used in the present invention are especially suited to accomplish this desired purpose.

In the art of xerography as now practiced commercially it is necessary that the developed image be capable of being transferred from the plate or surface upon which it resides to a second surface and that it be capable of being permanently fixed to such second surface, and both of these requirements are met by the toners of the present invention. As a matter of fact, the developers of this invention passes markedly improved properties in the matter of transferability, in that they may be transferred chemically or electrically, as well as magnetically, in which their greatest superiority lies. In the usual method of effecting transfer of the present toners by magnetic methods, a second material, say a sheet of paper, is placed over the developed image and in contact therewith, and, while so positioned, is subject to a magnetic field such as may, for example, be provided by either a permanent magnet or an electromagnet. Interesting and valuable combination results such as simultaneous transfer and fusion of the image body can also be achieved through such a magnetic field in combination with a high frequency electromagnetic field.

Highly useful results can also be achieved by combinations of the magnetic and electrostatic fields to effect differential transfer of an electroscopic developer or magnetic developer and the electroscopic-magnetic developer of the instant invention. Whatever method of transfer is used, the toner of the instant invention makes possible the use of all-optical methods to form magnetic tapes, sound tracks, etc. Even more interesting applications exist in using optical methods to form magnetic images which may then be used to activate a magnetic sensing device as a mark which would actuate a cutter or as a coded series of marks on a business machine card similar in purpose to that now performed by a combination of punched holes and electric sensing "fingers."

For this combination transfer-fusion results, it is necessary that the toner, or at least one component of it, be fixable or preferably thermoplastic, whereby this component is softened and caused to adhere permanently to the transfer member.

When fusing by means of high frequency electromagnetic fields, a high frequency source separate or combined with the permanent magnets must also be utilized. Such high frequency field heats the particles of magnetic material in the electroscopic binder causing the binder to soften and adhere to the plate. Previous toner compositions are incapable of being transferred and being fused by a high and low frequency electromagnetic field. It is also highly desirable to accomplish fusing by high frequency electrostatic fields as a separate and distinct step, i.e., not concurrent with image transfer. Modern business machines utilizing punched cards require a high degree of stability in the card material for operability. If a powder image is placed on such a card stock in the xerographic process and then permanently affixed thereto by heating, it has been found that the moisture loss necessarily incident to the heating step alters the dimensional stability of the card sufficiently so as to throw off the alignment of the holes thereby frustrating the sensitive device. The use of solvent vapors to fix the images carries with it severe problems of venting and toxicity. Fusing by means of high frequency electromagnetic fields serves to fix the powder images to the card stock without heating the card stock and, thus completely eliminating the problem of dimensional stability. It will be found as a result of the new and novel method herein disclosed that the toner particles are transferred from the original sheet to the copy, forming the desired permanent image of the original electrostatic image on the plate or web.

It is to be realized, of course, that the new electroscopic-magnetic toners of this invention are particularly valuable in combination with a magnetic transfer step or device or a magnetic transfer and fixing step or device, but that they are also useful, and frequently preferentially useful, with chemical transfer methods involving solubility of the toner or one of its components or with electrical or electrostatic transfer or combinations thereof.

Any of these or other methods may be employed in transferring the powders of the present invention, although improved speed of transferability, image retention and fixation may be obtained by transferring electromagnetically, utilizing a high and low frequency electromagnetic field, from the plate or surface upon which the image was developed to the second or transferred surface.

Figure 1:
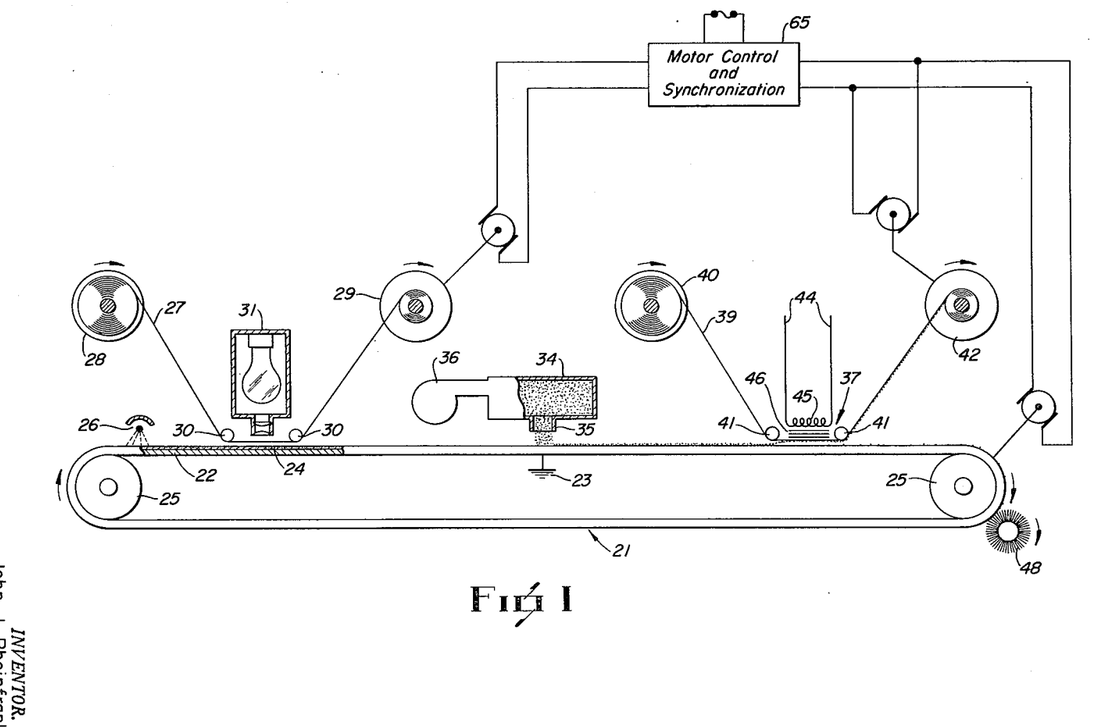
FIG. 1 is a schematic view, partly in side elevation and partly in vertical section, of one form of apparatus for developing powder images and then effecting electromagnetic transfer thereof.

Excellent reproductions of copy material can be obtained according to the present invention by utilizing the new and novel arrangement of apparatus disclosed in FIG. 1. In this apparatus the image bearing surface or electrophotographic member constitutes a continuous, flexible belt or web 21 comprising electrically conductive inner layer 22, such as a flexible copper strip, a flexible aluminum strip, aluminized or silvered plastic (such as polyethylene terephthalate, cellulose triacetate, or the like), flexible iron alloys having either magnetic or non-magnetic properties or other electrically conductive metallic or plastic foil or the like, contacting a suitable ground wire 23, and having a photoconductive insulating layer 24, for example, vitreous selenium or anthracene on at least one surface thereof. In addition, various alloys of selenium such as combinations thereof with arsenic or tellurium, may be used. Furthermore, in addition to uniform coatings of photoconductive insulating materials, the photo conductive insulating films may be formed by dispersing finely-divided photoconductive material in an electrically insulating resin binder as more fully described in U.S. 2,663,636 to A. E. Middleton. In addition to the materials specifically disclosed therein, other suitable photoconductive pigments known to those skilled in the art may be used such as zinc oxide, titanium dioxide, zinc-cadmium sulfide, indium trisulfide, gallium triselenide, tetragonal lead monoxide, mercuric sulfide, etc. either alone or in combination with each other or with suitable dye sensitizing agents. This image bearing member is positioned about driving rollers 25 positioned in a suitable frame (not shown) which carry and drive the continuous web and is constructed of such a size and shape that the flexible web easily bends around and is carried by such rollers without cracking or distortion of the light sensitive coating.

At one end of the web and slightly above the sensitive coating or layer, there is positioned electric charging apparatus 26, such as a corona discharge electrode, connected to a suitable source of electrical energy (not shown), for distributing an electric charge over the surface of the sensitive layer. Original or film strip 27 from supply reel 28 and collected on driver or take-up reel 29 is led between rollers 30 which hold it substantially firmly in close register with the charged web while light from a source 31 above the strip 27 and web 21 is focused on to the film causing portions of the sensitive layer struck by light, passing through the transparent section of the strip, to become electrically conductive, thereby discharging the electrical charges residing thereon and leaving the remainder as an electrostatic image of the original.

A source of developer is contained in supply box 34 which can be agitated to cause the developer to dust through opening 35 onto the traveling web containing the electrostatic image or it can be fitted with a blower 36 which will likewise agitate the powder and cause it to dust lightly onto the web where it is attracted to and held by the remaining electrostatic charges, thereby forming a powder image corresponding to the electrostatic image and the image on the original.

The transfer means generally designed 37 includes a transfer member 39, such as a strip or web of cellophane or paper, and is positioned beyond the developing means and adjacent the powder image on the traveling web and comprises a supply reel 40 containing the transfer material 39 which is led between a second set of rollers 41 to bear against, or in close register with the traveling web 21 containing the powder image and then wound up on power or take-up reel 42. Between said rollers 41 where said web 21 and transfer strip 39 are in transfer relationship is placed electromagnetic means, shown schematically, comprising lead wires 44, coil 45, and core 46, for effecting magnetic transfer of the electroscopic magnetic toner to the strip 39 and for heating the toner or its magnetic component. After transfer and fusion is effected, the image exists as a plurality of electroscopic-magnetic toner particles firmly bound to the transfer material and generally fused together. If desired, a rotating brush 48, or the like is disposed along the surface of the photosensitive member 24 between the transfer station 37 and the charging station 26 to remove residual quantities of the image powder.

Figure 2:
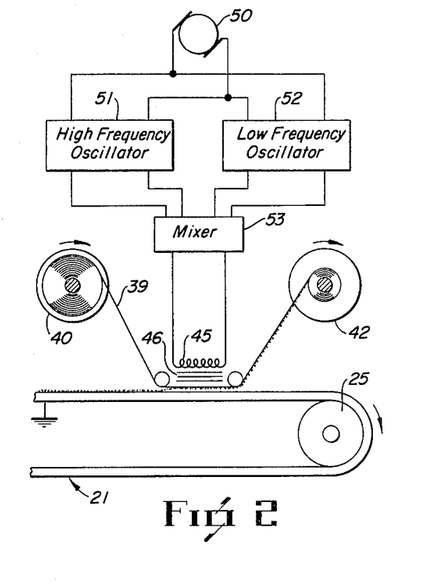
FIG. 2 is a schematic view of part of the arrangement of apparatus shown in FIG. 1 and showing means for effecting transfer of powder images by utilizing high and low frequency electromagnetic means.

In FIG. 2 there is shown a source 50 of electric current which is fed to a high frequency oscillator 51 and to a low frequency oscillator 52 to provide high and low fields for heating and transfer. Switching or mixing means 53 is provided in the circuit between the frequency sources and coils of the magnet to produce fields which are pulsating, continuous, simultaneous or successive. The function and identification of flexible web 21, driving rollers 25, transfer member 39, supply reel 40, take-up reel 42, coil 45, and core 46 are the same as described in connection with FIG. 1.

Figure 3:
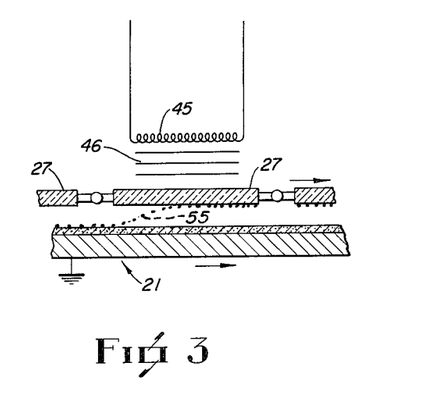
FIG. 3 is a schematic view of an arrangement of apparatus for effecting transfer and fusion of images to glass surfaces.

The use of the apparatus and method of the present invention to transfer images to various articles is clearly illustrated in FIG. 3 wherein electroscopic-magnetic powder image particles 55 are transferred by electro-magnetic means schematically represented by coil 45 and core 46 from the travelling developing web 21 to a transfer web or transfer articles 27 and fixed thereto. The distance between the web and the article has been exaggerated for purposes of illustration as in most cases it is negligible, for the article and the web containing the image actually are in contact to completely minimize distortion from unsupported passage of toner across an air gap.

Figure 4:
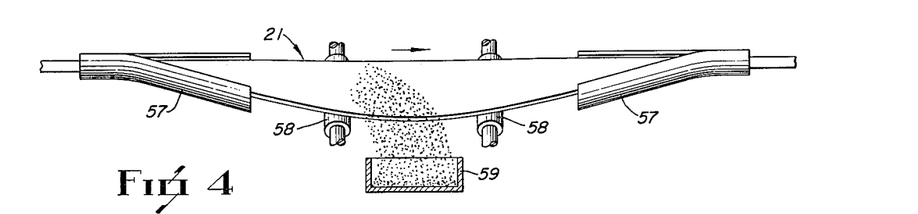
FIG. 4 is a partial vertical sectional view of a portion of the endless conveyor or web showing means to bend it from its normal line of travel and thereby cause the powder-carrier composition to move across the surface of the web carrying the electrostatic image and thereby develop it.
Figure 5:
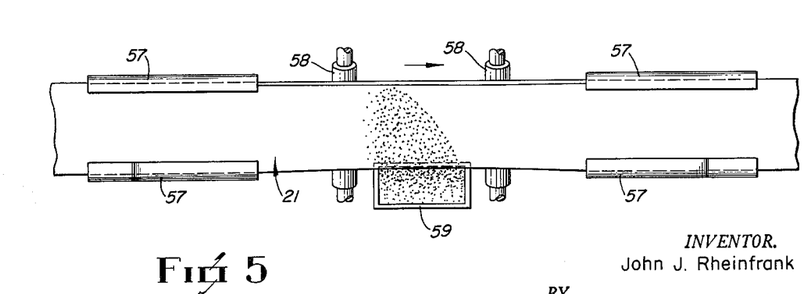
FIG. 5 is a plan view of the arrangement of apparatus shown in FIG. 4.
Figure 6:
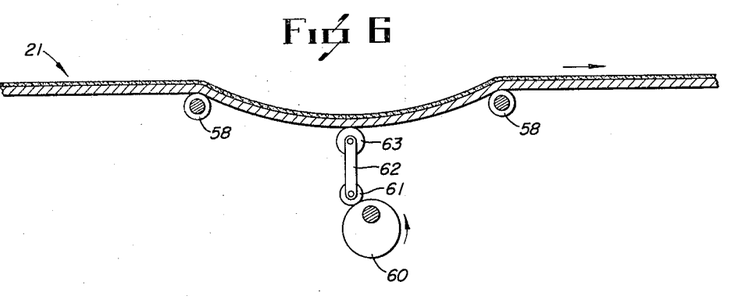
FIG. 6 is a partial vertical sectional view, a portion in side elevation, of an arrangement of apparatus for moving or vertically reciprocating the web to agitate or cascade a developer composition across the surface thereof and thereby develop the electrostatic image.
Figures 7, 8, 9, 10, 11:
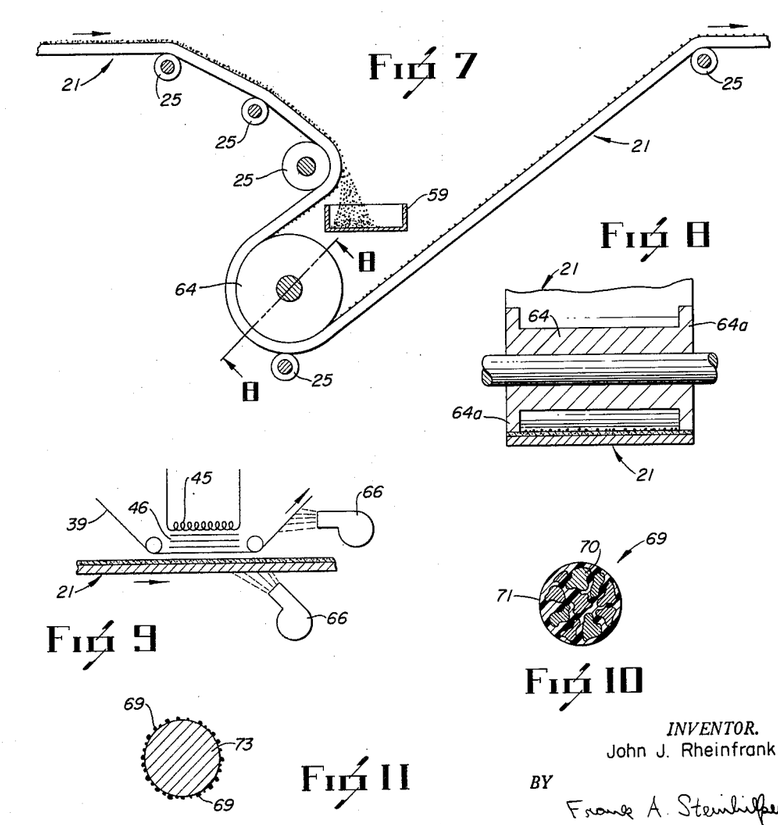
FIG. 7 is another view, partly in side elevation, of means for changing the direction of the web and for causing the developer composition to cascade across the surface thereof to develop an electrostatic image into a powder image.
FIG. 8 is a view along line A—A of FIG. 7, showing the structure of the guide roll.
FIG. 9 is a view, in side elevation, of an arrangement of apparatus for fixing the transferred image and for maintaining the selenium layer at a low temperature to prevent its change into the hexagonal form.
FIG. 10 is a greatly enlarged cross-sectional view of electroscopic-magnetic toner particles of this invention.
FIG. 11 is a cross-sectional view showing a developer carrier particle covered with electroscopic-magnetic toner particles.

When the electroscopic-magnetic powder developer contains a carrier material, it is necessary to cause the toner-carrier composition to flow across the plate to develop the image. Means to effect such a result is disclosed in FIGS. 4 and 5 wherein guides 57 positioned at the outer edges of the web 21 cause the web supported by rollers 58 to tilt from its normal direction of travel resulting in the carrier particles cascading across the plate and discharging therefrom into collecting tray 59 by gravity but leaving the toner on the web to form a powder image from the electrostatic image. Another means to cause the toner-carrier composition to cascade across the traveling web by agitation is shown in FIG. 6 wherein a gentle reciprocating motion is given to the web 21 (supported by rollers 58) by means of cam 60 which actuates cam roller 61 having rod 62 attached thereto carrying wheel or roll 63 which bears against the web 21. After the toner has been cascaded across the plate, the web can be turned from its path as shown by the guides in FIGS. 4 and 5 or by doubling the web on itself which also facilitates developing, as shown in FIGS. 7 and 8 where rollers 25 serve to carry and provide the necessary tension of the web while guide roll 64, having angular flanges 64a bearing against only the outer edges of the web 21, causes it to double back permitting the carrier particles to discharge into tray 59 while the developed powder image passes under the narrow portion of the drive roll without being disturbed.

Figure 16:
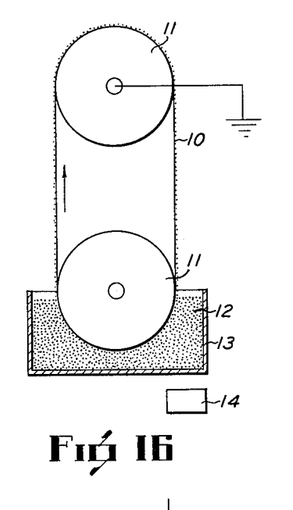
FIG. 16 is a side elevation of apparatus for applying a uniform layer of electroscopic-magnetic particles to a carrier surface.

Another carrier device according to the instant invention is shown in FIG. 16 wherein a flexible sheet 10, as of semiconducting rubber, metal coated on the outside thereof with a suitable plastic or resinous coating as of a polyester, an alkyd resin, a vinyl resin, an acrylic resin, a cellulose ester or ether, etc. is rotatably mounted on two drums 11 which are free to rotate about their longitudinal axis. A supply of electroscopic magnetic toner powder 12 is placed in a container 13 so that sheet 10 dips into and thoroughly contacts toner supply 12 in container 13. Agitator means as a solenoid 14, are desirably provided to agitate container 13 thereby preventing compaction of toner 12.

In operation, motor means, not shown, are actuated causing drums 11 to rotate thereby moving sheet 10 through rubbing contact with toner supply 12. Due to this contact both the toner particles and the surface of sheet 10 become electrostatically charged by reason of the triboelectric contact therebetween. If desired, to assure a greater degree of charging, suitable charging means as a corona generating source such as disclosed in U.S. 2,777,957 to L. E. Walkup, may be used to supply electric charges on sheet 10 as it emerges from toner supply 12 carrying a coating thereon of toner particles. As used to develop an electrostatic image, an insulating surface having thereon a suitable electrostatic image is brought into firm contact with sheet 10 having thereon a supply of toner particles as described. Thus toner bearing sheet 10 may contact a xerographic plate, as in the form of a drum or rigid planar surface, directly, or where in the form of a flexible sheet as a binder plate (i.e., a coating of a photoconductive pigment in an insulating binder on any suitable backing as metal, paper, plastic, etc.) as by positioning a drum opposite from drum 11 and passing the sheet having the electrostatic image thereon therebetween. The sheet bearing the electrostatic image may also be an insulating film insensitive to light as described hereafter. The surface of sheet 10 acts precisely like the surface of the granular carrier particles, as explained herein, retaining the toner particles thereon by reason of the electrostatic attraction between the toner particles and the surface of carrier sheet 10 except in those areas where the greater attraction of the electrostatic image on the image-bearing member extracts the toner from carrier sheet 10 whereby the toner deposits on the surface bearing the electrostatic image in conformity therewith.

Where sheet 10 is slightly electrically conductive as of semiconductive rubber or where it consists of a flexible metal as aluminum, copper, etc. coated with a thin plastic film, its effect is to bring an electrically conductive surface into very close proximity to the electrostatic image-bearing surface. The result is to cause the lines of force of the electrostatic image to be drawn externally above the image-bearing surface thereby making it possible deposition of powder in accordance with variations of electrostatic potential rather than merely in accordance with electrostatic gradients. The result is a complete and accurate rendition of large solid areas and more faithful development of half-tone electrostatic images.

Figure 17:
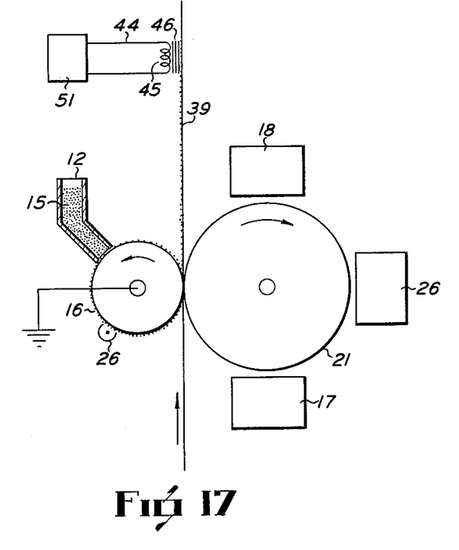
FIG. 17 is a schematic representation of another embodiment of xerographic apparatus for developing electrostatic images with electroscopic-magnetic toner.

A related device is shown in FIG. 17 wherein a toner supply 12 in a suitable hopper 15 contacts cylindrical drum 16 as shown. By reason of the sliding contact between the surface of drum 16 and the toner supply 12, the surface of drum 16 becomes coated with a layer of toner similar to sheet 39. The drum 21 is the same as in FIG. 12 and electrostatic images are repetitively formed thereon by suitable charging means 26, exposure station 17 and desirably, although not necessarily, erasure station 18 which uniformly floods drum 21 with light. Image support material 39, as paper, is developed by toner-coated drum 16 pressing sheet 39 into contact with drum 21 whereby toner transfers from drum 16 to sheet 39 in conformity to the electrostatic image on drum 21. Dielectric fusing means comprising lead wires 44, coil 45, and core 46 connected to a high frequency oscillator 51 provides a high frequency field to fuse the electroscopic magnetic toner to sheet 39 without heating sheet 39 and thereby adversely affecting its dimensional stability.

Figure 18:
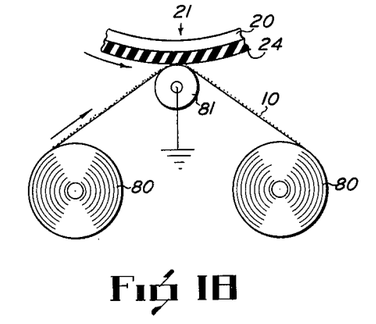
FIG. 18 is a side elevation of means for contacting an electrostatic image-bearing surface with a carrier surface bearing electroscopic-magnetic toner particles.

A similar development step is shown in FIG. 18 wherein a section of a drum 21 containing a conductive backing material 20 having coated thereon a layer of photoconductive insulating material 24 bearing an electrostatic image is contacted with sheet 10 bearing a coating of electroscopic magnetic toner fed from reels 80 into contact with the surface of layer 24 bearing the electrostatic image by means of a yielding conductive roller 81 whereby the electroscopic magnetic toner transfers across to surface 24 by reason of the electrostatic attraction thereby making visible the electrostatic image on surface 24 as explained above.

Figure 12:
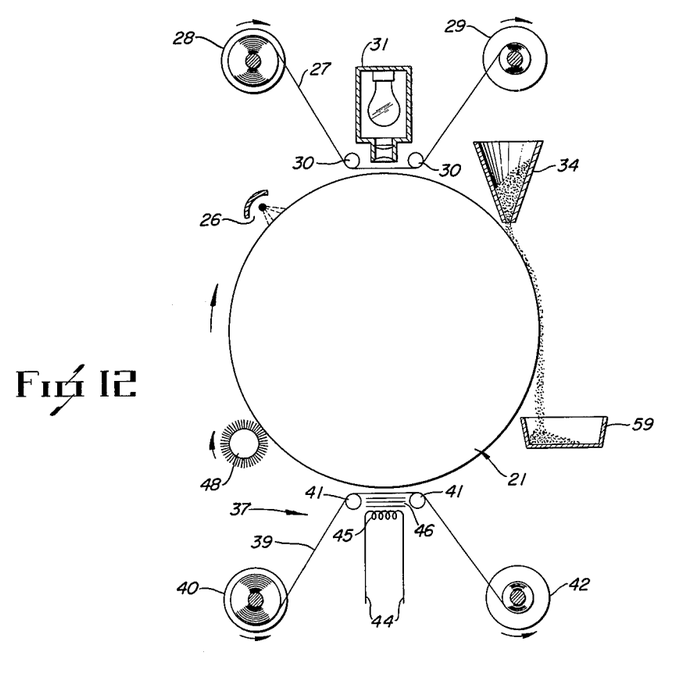
FIG. 12 is a schematic diagram of another embodiment of xerographic apparatus according to this invention.

It is apparent that the xerographic mechanism can be operated with a web in the form of a cylindrical surface, and such is shown in schematic diagram in FIG. 12. In this embodiment a cylindrical image bearing surface 21 is rotated past a source of an optical image such as film 27 or the like fed from roll 28 to take up roll 29 under rollers 30 adjacent to light source 31 and thence through a development station where a toner-carrier developer composition of this invention is cascaded from a supply hopper 34 across the cylindrical surface to a catching member 59. At a transfer station 37 a transfer member 39 is passed from roll 40 to roll 42 across rollers 41 adjacent to the surface and transfer is accomplished as in the devices of the previous figures, by a coil 45 energizing core 46 with electric current from leads 44. The surface then desirably passes through a cleaning station 48 and a charging station 26, thence again through the cycle.

Figure 13:
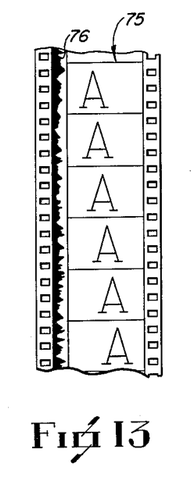
FIG. 13 is a plan view of a portion of an original motion picture film strip.
Figure 14:
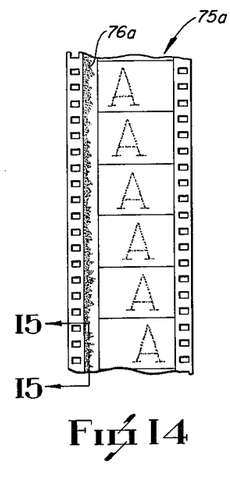
FIG. 14 is a plan view of a reproduction according to the present invention, the developer particles being exaggerated.
Figure 15:
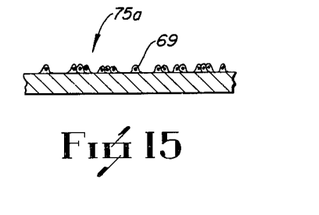
FIG. 15 is a vertical sectional view along the line 15—15 of FIG. 14.

FIGURES 13, 14 and 15 show a film strip 75 bearing a sound strip 76, reproduced as film strip 75a in FIGURES 14 and 15 with a magnetic toner yielding directly a magnetic sound strip 76a consisting of magnetic toner particles 69 corresponding to the sound image of the original and thus directly useful in magnetic sound reproduction.

When operating with certain vitreous selenium films, the photosensitive member must be maintained at about room temperature and not above about 50° C., to prevent formation of hexagonal selenium which would adversely affect its electrophotographic properties. Therefore, the web and transfer strip may be passed through the transfer zone at a speed which is sufficient to prevent any heating of the selenium or other electrophotographic or electrographic layer due to the effect of the high frequency field heating the magnetic portions of the developer powder or heating the conducting base if made of material subject to high frequency fields. It will be understood that, when cooling means are not utilized, the speed of the transfer strip and electrophotograhpic web may be adjusted in order that the web will pass through the transfer zone without heating and the powder image will also transfer onto the transfer strip without distortion. A motor control and synchronization system 65 is shown in block diagram in FIG. 1 to accomplish this result as well as to assure transfer in register between the various members. Moreover, as in FIG. 9, suitable cooling means 66 may be positioned adjacent the transfer strip containing the transferred powder image to direct a blast of cooling air against the heated resin to cause it to rapidly harden or set, and adhere to the transfer strip so that when it is wound up on the take-up reel, the powder particles will not stick to adjacent layers to distort the developed picture. The function and identification of flexible belt or web 21, transfer member 39, coil 45 and core 46 are the same as described as in connection with FIG. 1.

While heat is very disadvantageous in its effect on amorphous selenium, heating of binder plates (i.e., a photoconductive insulating pigment in an electrically insulating resin binder as described above) has no such undesirable effect on the xerographic properties of the material and, in fact, has been observed to be highly beneficial thereto. Thus, when the photoconductive insulating surface comprises such a material, i.e., a photoconductive pigment in a binder, the apparatus need not provide for any extra cooling means. If simultaneous transfer and fusing is to be used, it is desirable to coat the photoconductive insulating surface (irrespective of its nature) with a suitable adhesive material such as polytetrafluoroethylene, various silicone materials, etc. to avoid unwanted adhesion of toner particles thereto.

If desired the dusting apparatus can be connected to drying towers and a heater to reduce the moisture content of the air and also the powder it contacts. Thus, when it is caused to circulate through the apparatus to effect agitation of the powder particles before and during dusting, the particles readily dust without clumping, sticking, or causing imperfect powder images. The return pipe leading back to the blower is fitted with a sieve to remove the particles from the air stream which would clog the drying tower. A valve provides means for entry of fresh air in desired regulated amounts.

The novel developer compositions of the instant invention have special utility in developing electrostatic images. In the normal xerographic process such images are created and developed on the surface of the photoconductive insulating member which is generally amorphous selenium. In addition, rather than developing the electrostatic image on the photoconductive insulating layer, if desired the electrostatic image pattern may be transferred to an electrically insulating film as polyethylene terephthalate. This process is described more fully in U.S. 2,825,814 to L. E.

Walkup. The toner composition of the instant invention may then be used to develop the electrostatic image on this insulating film to form a powder image corresponding to the electrostatic image thereon. The resulting powder image may then be either permanently affixed to the insulating film or transferred to a support member as paper, metal, plastic, etc. and the insulating film cleaned and reused in the process.

In a presently preferred embodiment of the invention, as illustrated in FIG. 10 the toner particle 69 is a two-component material containing one or more magnetic pigment particles 70 held in a binder 71. Generally speaking, this binder should be non-tacky, whereby it is readily removed from the image surface, and fusible by heat or solvent, whereby the transferred image body can be permanently fixed on the transfer surface.

The thickness of the electroscopic binder on the magnetic particles is such that sufficient binder is present to effectively coat the magnetic material or substantially coat it so that the toner particle will effectively move or be attracted by electrostatic forces in order to develop the electrostatic image and fuse to the transfer material. The toner particles do not necessarily need to be spherical in shape although obviously such is more desirable as it facilitates dusting and tends to make resulting pictures of even density throughout. As used in developing electrostatic images the toner composition is loosely coated on a carrier surface to which it remains loosely affixed by reason of electrostatic attraction thereto. The most widely used method of carrier development is known as cascade carrier development as more fully described in U.S. 2,618,551 to L. E. Walkup; U.S. 2,618,552 to E. N. Wise; and U.S. 2,638,416 to Walkup and Wise. In this process the electroscopic toner is desirably mixed with a granular carrier, either electrically conducting or insulating, magnetic or non-magnetic, provided that the particles of granular material when brought in close contact with the powder particles acquire a charge having an opposite polarity to that of the powder particles adhering to and surrounding the granular carrier particles. In FIG. 11 a carrier particles 73 is shown in cross-section carrying a number of toner particles 69 held thereon by virtue of their triboelectric properties.

The electroscopic component of the improved toner of this invention should have the property of being electrically attracted to, or repelled by, the charges on the surface of the plate. The electroscopic component should readily flow when heated and quickly coat and firmly adhere to the base without smudging or distortion and thus should also function as a binder when fused to the transfer medium or copy, as by means of heat, chemical, or other action. The electroscopic material should adhere on transfer to such bases as cloth, glass, and magnetic or nonmagnetic metals, paper, wood, and synthetic materials like nylon, rayon and cellulose acetate and nitrate. Organic resins have been found to have such desirable properties. Examples of suitable electroscopic materials of this type are phenoyl-formaldehyde resins, rosin-modified phenol-formaldehyde and maleic glyceride resins, polystyrene and butadiene-styrene copolymers, asphalts, such as gilsonite, manjak and asphaltite, calcium lactate, rosin, chlorinated rubber, glycol and glyceryl esters of hydrogenated rosin, polystyrene resin, Pliofilm (rubber hydrochloride), polyvinyl chloride, polyvinyl acetate, polyvinyl butyral, copolymerized vinyl chloride and vinyl acetate resins, other vinyl resins, alkyd resins, acrylic resins and the like. These materials can be used singly or mixed together as desired, and may be mixed together by dissolving in a solvent or by milling or mixing in conventional rubber or other compounding machinery.

The magnetic component should be a material which will respond to a low or high frequency magnetic field so that it will readily transfer the electroscopic binder and preferably can be heated, thereby causing the electroscopic component of the developer to melt or flow and become attached to the transferred material. Magnetic materials suitable for the purposes of the present invention are magnetic iron and its alloys, such as nickel-iron alloys, nickel-cobalt-iron alloys, and magnetic oxides, such as hematite ($Fe_2O_3$) and magnetite ($Fe_3O_4$) and ferromagnetic ferrites. Cobalt and its alloys are also useful, such as, for example, aluminum-nickel-cobalt, copper-nickel-cobalt, and cobalt-platinum-manganese alloys. Moreover, other alloys, such as certain magnetic alloys of aluminum, silver, copper, magnesium and manganese can likewise be used with satisfactory results. These materials can be added singly or in mixtures to the electroscopic powder component.

The magnetic component should be finely divided, as this enables it to be readily mixed or coated with the organic electroscopic binder component and greatly increases its pigment value. The magnetic component should be substantially coated or firmly attached to a relatively larger amount, areawise, of the electroscopic component in order that the powder will readily be influenced by and develop elecrostatic images since the magnetic component itself may not be susceptible to electrostatic charges and not, by itself, developed. Particle sizes of 1 to 20 microns will be satisfactory for producing good, clear dense pictures.

There should be sufficient resin present in the composition so that the resin, containing the magnetic component, will respond to the electrical charges on the plate and thereby develop a picture even if the magnetic component not be electroscopic. There should also be sufficient resin present to hold the magnetic portion when the powder is transferred and fixed. The magnetic material should be present in an amount sufficient to respond to the electromagnetic field and to carry the resin through such a field, as well as to have a mass or volume to provide, under the influence of a high frequency electromagnetic field, sufficient heat to fuse or flow the resin attached to it. It has been found that the ratio of binder or resin to the magnetic component can vary from 19 to 1 to 2 to 3. For the best results, there should be at least 20% of the magnetic powder, but not over 70%, as the higher amounts may contain too little binder to satisfactorily secure the magnetic portion to the transferred media.

The magnetic developer powder can be readily prepared by first finely dividing or crushing the resin material, after which it is mixed with the magnetic material. Thorough mixing is necessary in order to insure that the magnetic particles have been entirely encased with the binder. The mixed resin and magnetic powders are melted and stirred to thoroughly disperse the magnetic powder in the resin. The mass is then permitted to cool, and preferably is mixed on a rubber mill where the heated rollers assure sufficient plasticity to blend the components thoroughly, after which it is broken into small chunks and again subdivided. It is then micronized and sieved to size. Obviously other methods can readily be devised by those skilled in the art for the production of extremely fine pigmented resin powders of this type where the pigment particles are magnetic in character.

The novel electroscopic-magnetic toners of this invention can be used with, or without, carriers as will be more fully discussed below. However, for most purposes, it may be desirable to use a carrier component as a sheet or roller or, when the mixture is dusted or cascaded across a plate a granular carrier. Thus, before the picture is developed from the electrostatic image, the prepared electroscopic-magnetic toner is desirably mixed with a granular carrier, either conducting magnetic or insulating, provided that the particles of granular material when brought in close contact with the toner particles acquire a charge having an opposite polarity to that of the toner particles, such that the toner particles adhere to, and surround, the granular carrier particles. The carrier is also selected so that the toner particles acquire a charge having the opposite polarity to that of the electrostatic image.

Thus, the materials for the carrier surface are selected in accordance with their triboelectric properties with respect to the electroscopic-magnetic toner, so that, when mixed or brought into mutual contact, one material is charged positively if the other is below it in a triboelectric series, and negatively if the other material is above it in a triboelectric series. The selection can be made from many materials that have been tested, and occupy recognized positions in a triboelectric series so that, when mixed, they acquire opposite triboelectric charges, the charge acquired by the electroscopic toner particles having a polarity opposite to that of the charged areas of the dielectric layer on the plate and also opposite to that of the carrier surface.

By selecting materials in accordance with their triboelectric effect, the polarities of their charges, when mixed are such that the electroscopic toner particles adhere to and are coated on the carrier surface, and also adhere to the electrostatic image on the plate which thus retains the electroscopic toner in the charged areas that have a greater attraction for the electroscopic toner than the carrier surface have. If desired, the triboelectric relationship of the carrier and toner and the developing conditions may be so adjusted as to yield photographic reversal.

When the mixture of electroscopic-magnetic material and carrier is used with a positive charge on the plate or web and a direct rather than reversal print is desired, the electroscopic-magnetic toner should be capable of acquiring a negative charge by contact with the dielectric material, and the granular or sheet material should be capable of acquiring a positive charge at the same time by such contact. An example of a mixture that can be used with a positively charged plate is calcium lactate as an electroscopic material which is mixed with ammonium chloride as a carrier in the proportion of approximately ten parts by weight of the granular carrier to one part of the powder developer.

In cases where the granular carrier is capable of acquiring a negative charge and a direct print is desired, or where a negative or reversal print is desired from a positively charged image, the plate is given a negative charge, and the electroscopic-magnetic toner is selected so as to acquire a positive charge. Such a result can be had with Gilsonite, an asphaltite found in Eastern Utah and Western Colorado, or Manjak, an asphaltite found in the East Indies, as the electroscopic binder material, with the magnetic material, and then mixed with ammonium chloride in the proportion of five parts of the latter to one part of the electroscopic-magnetic powder; or, ten parts of ammonium chloride to one part of a magnetically pigmented phenol-formaldehyde resin.

The granular carrier particles are grossly larger than the toner particles by at least one order of magnitude of size, and are shaped to roll across the image bearing surface. Generally speaking, the carrier particles should be of sufficient size so that their gravitation or momentum force is greater than the force of attraction of the toner in the charged areas where the toner is retained on the plate in order that the granular carrier particles will not be retained by the toner particles, while, at the same time, the toner particles are attracted and held, or repelled, as the case may be, by the charged or uncharged areas of the plate, since they acquire a charge of opposite polarity to the charges of both the granular carrier particles and the plate. It has been found best to use granular carrier particles of a size larger than about 200 mesh, usually between about 20 and about 60 mesh, and electroscopic powder particles of a size of from 1 to 20 microns, usually about 5 microns. The granular carrier particles may, if desired, be somewhat larger or smaller, as long as a proper size relationship to the electroscopic toner is maintained, so that the granular carrier particles will flow easily over the image surface by gravity when the plate is inclined, without requiring additional means or measures to remove them.

The degree of contrast or other photographic qualities in the finished image may be varied by changing the ratio of granular carrier to electroscopic toner. Successful results have been had with from about 10 to about 200 parts by weight of granular carrier particles capable of being passed through a 30-mesh screen, and being collected on a 60-mesh screen, to one part of micronized electroscopic-magnetic toner having a particle size of 1–20 microns. Generally speaking, carrier-toner ratios in the order of about 100:1 prove satisfactory and preferred compositions run from about 70:1 to about 150:1. In such preferred compositions, the carrier acts effectively to remove any toner particles which might tend to adhere to a nonimage area and the toner itself forms a dense, readily transferrable and fusible image.

The granular carrier may consist of materials, granular or pulverized and coated or uncoated, such as, for example, polymerized methyl methacrylate resin, sodium chloride, silicon carbide, ammonium chloride, aluminum potassium chloride, Rochelle salt, sodium nitrate, aluminum nitrate, potassium chlorate, zircon oxalic acid, glass beads, soy bean protein, polystyrene, and adipic acid. These granular carrier particles may be of any shape within the preferred size range, although it is desirable to have them round, or nearly round, so as to facilitate their movement in gravitating over the plate. Particularly desirable carrier structures are disclosed in U.S. 2,618,551 to L. E. Walkup.

In addition to the use of granular particles to provide the carrier surface, the bristles of a fur brush may also be used. Here also, the toner particles acquire an electrostatic charge of polarity determined by the relative position of the toner particles and the fur fibers in the triboelectric series. The toner particles form a coating on the bristles of the fur, clinging thereto by reason of the electrostatic attraction between the toner and the fur just as the toner clings to the surface of the granular carrier particles. The general process of fur brush development is described in greater detail in U.S. patent application Ser. No. 401,811, filed by L. E. Walkup on January 4, 1954.

Still another method of carrier development is known as sheet carrier development in which the toner particles are placed on a sheet or pellicle as of paper, plastic, or metal. This process is described in U.S. patent application Ser. No. 399,293, filed by C. R. Mayo on December 21, 1953, now U.S. Patent No. 2,895,847. As described therein the electrostatic attraction between the sheet surface and toner particles necessary to assure electrostatic attraction therebetween may be obtained by leading the sheet through a mass of electroscopic toner particles whereby there is obtained a rubbing or sliding contact between the sheet and the toner. In general it is desirable to spray the surface of the sheet bearing the electroscopic toner particles with ions of the desired polarity as by use of a corona charging device as described in the aforesaid application of Mayo. In any event, as used in developing an electrostatic image the toner composition of the instant invention is electrostatically coated on a suitable carrier surface which is then in turn contacted with the surface bearing the electrostatic image whereby the electroscopic-magnetic toner particles are transferred to the surface bearing the electrostatic image to form thereon a powder image corresponding to the electrostatic image.

It is, thus, seen that the present invention provides a very efficient powder developer composition, article, method of development and apparatus for use therewith. Significantly blacker transferred images have been obtained with the composition of the present invention than have been known in the prior art and the transfer is substantially independent of and unaffected by atmospheric conditions and the like. Furthermore, the image member, according to the present invention, can be more easily cleaned than when using conventional powder developers. The present process and composition facilitates the reproduction of stencils and other originals, and particularly sound records previously difficult to reproduce by xerography and by conventional printing and photographic methods. Further, it makes possible great flexibility in design of computers and business machines by reason of affording differential image effects due to response to both magnetic and electrostatic fields. Particularly, there is no need to separately heat to fix the developer of the present invention but the same is put in the proper condition at the time of transfer. A particular advantage is that the toner composition of the invention is useful in placing variable information on punched cards and being permanently affixed thereto without in any way affecting the dimensional stability of the card stock.

It is, thus, seen that the invention disclosed therein, provides a new and novel xerographic developing composition, as well as a new and novel method and means of achieving transfer of a developed image from plate or an image bearing surface to produce a novel image which is permanently fixed thereto, as well as apparatus for effecting such purposes. In a specific embodiment of the invention these new and novel results have been achieved with a toner for xerography having magnetic and electroscopic components which is transferred and simultaneously fixed automatically by the utilization of a high and low electromagnetic field, wherein the electromagnetic field heats the magnetic body at the same time causing the resin to flow approximately while being transferred, and thereby fuses it to the transfer medium directly on contact.

In particular, by using magnetic transfer the electrostatic image is unaffected by the transfer operation thus permitting a multiplicity of powder images to be formed and transferred without recharging and re-exposing.

Having thus described the invention, what is claimed as new and novel and is desired to be secured by Letters Patent is:

I claim:

1. An improved xerographic developer consisting essentially of finely-divided toner powder particles uniformly electrostatically coated on a carrier surface capable of retaining said powder particles by electrostatic attraction, the carrier surface being adapted to make firm contact with a surface bearing an electrostatic image and having removably coated thereon by electrostatic attraction xerographic toner particles having a particle size on the average less than about 20 microns, said toner particles consisting essentially of from 19 to 2 parts by weight of at least one organic resinous binder and from 1 to 3 parts by weight of at least one ferromagnetic material.

2. An improved xerographic developer composition according to claim 1 wherein the binder is a styrene resin.

3. An improved xerographic developer composition according to claim 1 wherein the binder is rosin-modified phenol-formaldehyde resin and the ferromagnetic material is iron.

4. An improved xerographic developer composition according to claim 1 wherein the binder is a rosin-modified phenol-formaldehyde resin and the ferromagnetic material is magnetite.

5. An improved xerographic developer composition according to claim 1 wherein the binder is butadiene-styrene copolymer and the ferromagnetic material is iron.

6. An improved xerographic developer composition according to claim 1 wherein the binder is a butadiene-styrene copolymer and the ferromagnetic material is magnetite.

7. An improved xerographic developer consisting essentially of a mixture of finely-divided toner powder particles and carrier particles shaped to roll across a surface, said toner powder particles electrostatically coated on said carrier particles, the carrier particles being substantially spherical and of a size of at least about 200 mesh and having removably coated thereon by electrostatic attraction toner powder particles having a particle size on the average less than 20 microns, said toner powder particles consisting essentially of from 19 to 2 parts by weight of at least one organic resinous binder and from 1 to 3 parts by weight of at least one ferromagnetic material.

8. An improved xerographic developer composed according to claim 7 wherein the binder is a styrene resin.

9. An improved xerographic developer composed according to claim 7 wherein the binder is rosin-modified phenol-formaldehyde resin and the ferromagnetic material is iron.

10. An improved xerographic developer composition according to claim 7 wherein the binder is a rosin-modified phenol-formaldehyde resin and the ferromagnetic material is magnetite.

11. An improved xerographic developer composition according to claim 7 wherein the binder is butadiene-styrene copolymer and the ferromagnetic material is iron.

12. An improved xerographic developer composition according to claim 7 wherein the binder is butadiene-styrene copolymer and the ferromagnetic material is magnetite.

References Cited by the Examiner

UNITED STATES PATENTS

| | | | |
|---|---|---|---|
| 1,930,788 | 10/1933 | Buckner | 117—17 XR |
| 2,357,809 | 9/1944 | Carlson | 117—17.5 XR |
| 2,503,947 | 4/1950 | Haskew | 252—62.5 XR |
| 2,525,601 | 10/1950 | Howell | 252—62.5 XR |
| 2,563,520 | 8/1951 | Faus | 252—62.5 |
| 2,618,551 | 11/1952 | Walkup | 252—62.1 XR |
| 2,638,416 | 5/1953 | Walkup et al. | 252—62.1 |
| 2,753,308 | 7/1956 | Landrigan | 252—62.1 |
| 2,758,525 | 8/1956 | Monerieff-Yeates | 96—1 |
| 2,784,109 | 3/1957 | Walkup | 117—17.5 |
| 2,857,290 | 10/1958 | Bolton | 117—17.5 |

FOREIGN PATENTS 407,978  3/1934  Great Britain.

JULIUS GREENWALD, *Primary Examiner.*
PHILIP E. MANGAN, RICHARD D. NEVIUS,
*Examiners.*